United States Patent [19]
Michaelis

[11] Patent Number: 5,928,463
[45] Date of Patent: Jul. 27, 1999

[54] DEVICE FOR PRODUCING HEAT INSULATING BODIES

[76] Inventor: Ralf Michaelis, Tengstrasse 41, 80796 Müchen, Germany

[21] Appl. No.: 08/765,611
[22] PCT Filed: Jun. 13, 1995
[86] PCT No.: PCT/DE95/00788
  § 371 Date: Dec. 23, 1996
  § 102(e) Date: Dec. 23, 1996
[87] PCT Pub. No.: WO95/35198
  PCT Pub. Date: Dec. 28, 1995

[30]       Foreign Application Priority Data

Jun. 21, 1994  [DE]  Germany .............................. 44 21 625

[51] Int. Cl.⁶ .................................................... B29C 43/56
[52] U.S. Cl. ........................................... 156/382; 156/556
[58] Field of Search ..................................... 156/382, 245, 156/109, 556

[56]             References Cited

U.S. PATENT DOCUMENTS 2,921,422  1/1960  Sprinkle ...................................... 53/80
  3,562,078  2/1971  Zumstein ........................... 156/73.5 X
  5,017,252  5/1991  Aldrich et al. ........................... 156/109
  5,139,595  8/1992  Taylor ................................. 156/109 X

*Primary Examiner*—Francis J. Lorin
*Attorney, Agent, or Firm*—Horst M. Kasper

[57]             ABSTRACT

The invention relates to a device for producing heat insulating bodies in the form of multi-layered bodies. Insulating bodies and processes and arrangements for evacuating and filling plastic containers with powdered or pourable materials are know per se. The size of these containers is very limited owing to the use of evacuation chambers. The new device makes it possible to produce heat insulating containers of any size and shape with an evacuated inner chamber with at least one filling at a wide variety of points. To this end, the insulating body is connected to a processing chamber (1) and both are evacuated at the same time via an aperture in the insulating body. An evacuated heat insulating body is obtained by means of a cover which is welded to it by means of a coupled electron beam gum and thus seals the aperture. It is distinguished by long useful life and can be easily disposed of in an ecologically acceptable manner.

19 Claims, 5 Drawing Sheets

DEVICE FOR PRODUCING HEAT INSULATING BODIES

BACKGROUND OF THE INVENTION

Heat insulating bodies with evacuated inner chamber are already known. Heat insulating bodies of that kind are described for instance in the laying open to the public inspections and the patent documents as follows DE OS 26 52 295, DE OS 34 14 665, DE PS 36 30 399, DE OS 37 41 239, DE OS 38 43 907, DE OS 39 40 649, DE OS38 28 669, DE OS39 15 170, DE OS 40 19 870 and DE OS 42 14 002. In their basic structure these solutions show on principle the same construction. The insulating layer bases upon the principle that a insulated body or container which has been evacuated shows a filling material of various kind. The filling serves for the stability of the evacuated insulating body. The presented documents differ essentially from the material of the fillings. The form of the evacuated insulating bodies may be of various size and shape.

The tenor of the documents U.S. Pat. No. 4,175,162 and U.S. Pat. No. 4,268,581 is heat impending panels in form of fire insulating glass pane structures and its production. These are distinguished by an built up of layers. In the document U.S. Pat. No. 4,175,162 these structures are brought together in an evacuated chamber and are brought together by means of an additional evacuation during the joining of the individual layers. A multiple chamber system has been proposed whereby in the preliminary chamber these structures are preheated.

The documents DE PS 40 40 144, EP O 380 812 and U.S. Pat. No. 3,996,725 give a description of procedures and arrangements which lead to hermetically packing of substances that are not supposed to contact the atmosphere during the process of filling. The documents DE PS 40 40 144 specify a method of filling powdered material, stored in a collecting tank, in a container e.g. a sac, connected with said container, as well as a device to carry out this method. The tenor of this document is the filling of powdered materials without letting escape pieces of said materials in the environment. At the same time the filled plastic sac is sealed with two opposing welding bars which are heated electrically and moved together mechanically. After having finished the process of filling, the device for filling has to be opened by means of a movable side wall and the filled sac is replaced by an empty one.

A similar process and a similar device are described in the document EP O 380 812. Thereby large packing till 100 1 especially for powdered milk are filled and sealed in a inner part of an evacuation chamber. This solution specifies a discontinuous process of filling and evacuation which becomes continuous by means of several chambers.

The document U.S. Pat. No. 3,996,725 describes a device for filling solid and liquid materials under vacuum in thermoplastic containers. These containers are filled in a evacuating chamber and are sealed owing to heat sealing by means of a heating element. At the end of this process these containers fall out of the evacuation chamber, said chamber is open.

The documents mentioned above give a description of insulating bodies in itself respectively of processes and arrangements for evacuating and filling plastic containers with powdered or free-flowing materials. The size of this container is very limited owing to the use of evacuating chambers. These stated containers are of a capacity till 100 1. As a consequence these arrangements are not suitable for the production of insulating bodies in form of panels or other sizes of larger dimensions. The sealing of the plastic containers is based upon the heat welding of the used plastic, so that materials of different quality may not be used.

The invention mentioned in claim 1 involves the problem of producing heat insulating bodies, by means of a device, of any size and shape with an evacuated inner chamber with at least one filling at a wide variety of points.

The archived advantages of this invention consist in particular in the production of insulating bodies of any size and shape with an evacuated inner chamber. The insulating body should be composed of a thermal non conductive framing, metallic side walls as well as of a filling consisting of a thermal non conductive material, said material serves for the stability of the evacuated inner chamber preferably designed like a panel. These fillings should be composed of microporous material by preference. The advantages of the evacuated inner chamber result mostly in considerably long useful life of the insulating body by means of fillings in a evacuated and hermetically sealed chamber, sealed against the environment, as it is shown at the moment by using foamed materials because of their absorption of humidity from the environment. Equivalent to this facts is of course a considerably long useful life of the insulating body in itself while the insulating values remain constant. With necessity as a result there are further advantages, consisting mainly in long-lasting energy saving, based upon the constant conditions of insulation, preventing the use of foamed materials and as a result of this a vital saving of ecologically dangerous chemicals and that heat insulating bodies produced with this device can be easily disposed of. The used fillings are reusable at any time and the metallic side walls are recyclable at any time by making them up for the raw material circuit. This device is furthermore distinguished by simple construction and as a consequence its integration in an one-product line that already exists or has to be constructed can be easily realized as well as its technological handling.

Advantageous combinations of the invention are described in the claims 2 to 11. According to claim 2 which comprises the development of the cover magazine and the connection of the later with a movable carriage that runs by a linear kind of actuation. The development according to claims 3 to 5 comprises special constructions of the handling system for the covers. This handling system according to claim 3 appropriately consists in a gripper and a perpendicular movable lifting unit. The gripper according to claim 4 consists of two U-shaped shells embracing the cover as a whole, so that said cover can be positioned on top of the wall of the insulating body. According to claim 5 these U-shaped shells are joined at least via two linear propulsive systems.

The developments according to claims 6 to 11 comprise modifications of the apparatus concerning the solid and hermetic joints of the cover with the heat insulating body. This apparatus according to claim 6 may be realized by using an electron beam gun, according to claim 8 a laser beam welding plant or according to claim 10 an electric welding apparatus. Using an electron beam gun according to claim 6 includes at the same time the integration of an apparatus into the processing chamber to control the electron beam. Appropriately the electron beam gun according to claim 7 is fitted with another vacuum producing device to benefit of the possibility to use a higher pressure level in the processing chamber. The laser beam according to claim 9 has to be placed by means of a beam guiding system in such a fashion that the outer contour of the cover is connected to the wall of the insulating body.

According to claim 11 it is also possible to obtain the sealing by means of an electrically runned contact electrode to weld the cover with the heat insulating body.

DESCRIPTION OF THE DRAWINGS

An example of the invention is shown in the drawing and shall be made clear by the following description, in which.

DETAILED DESCRIPTION OF THE INVENTION

Figure 1:
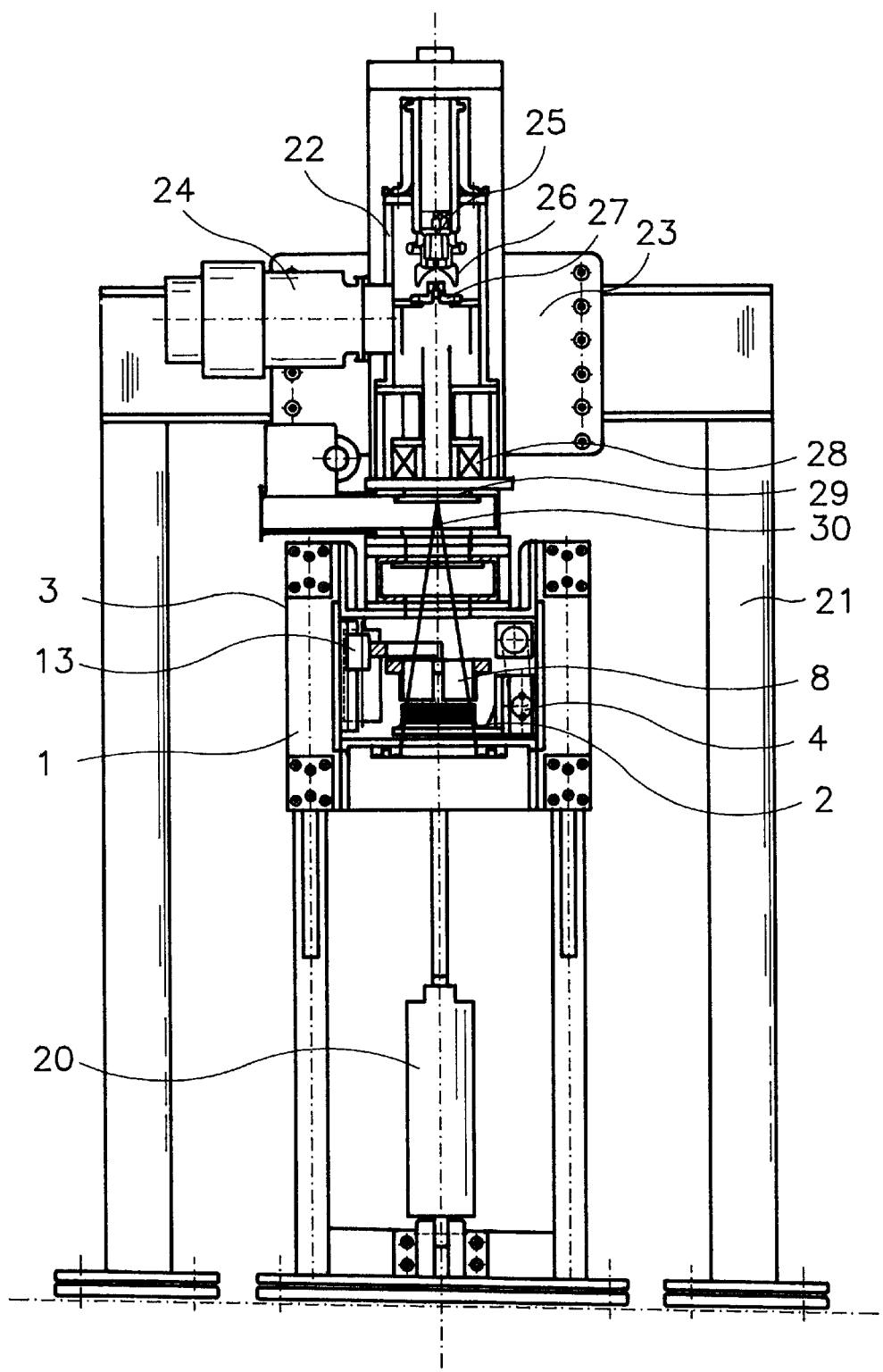
FIG. 1 shows the device for producing heat insulating bodies solidly mounted on a frame.
Figure 2:
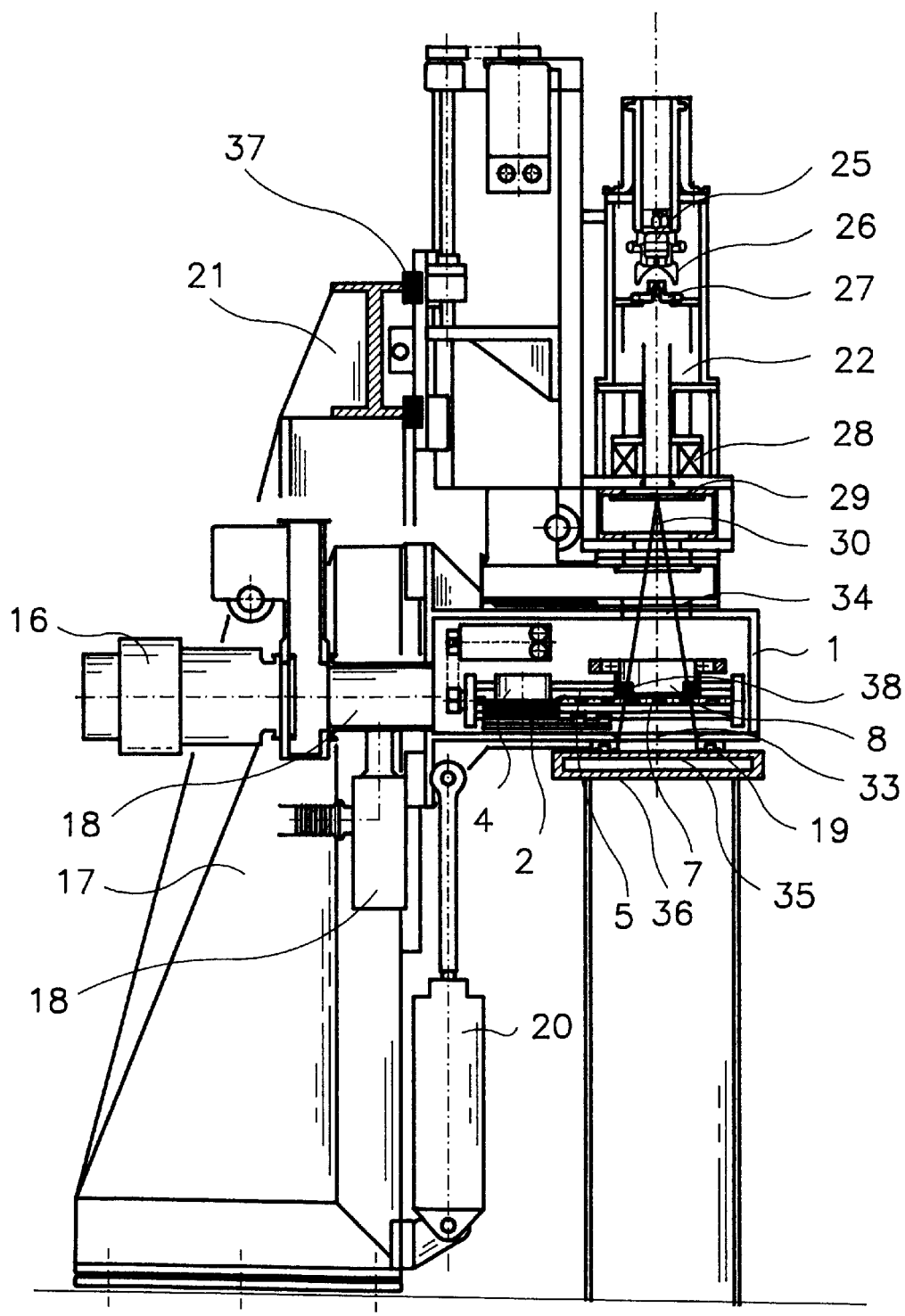
FIG. 2 shows the device in the side view
Figure 3:
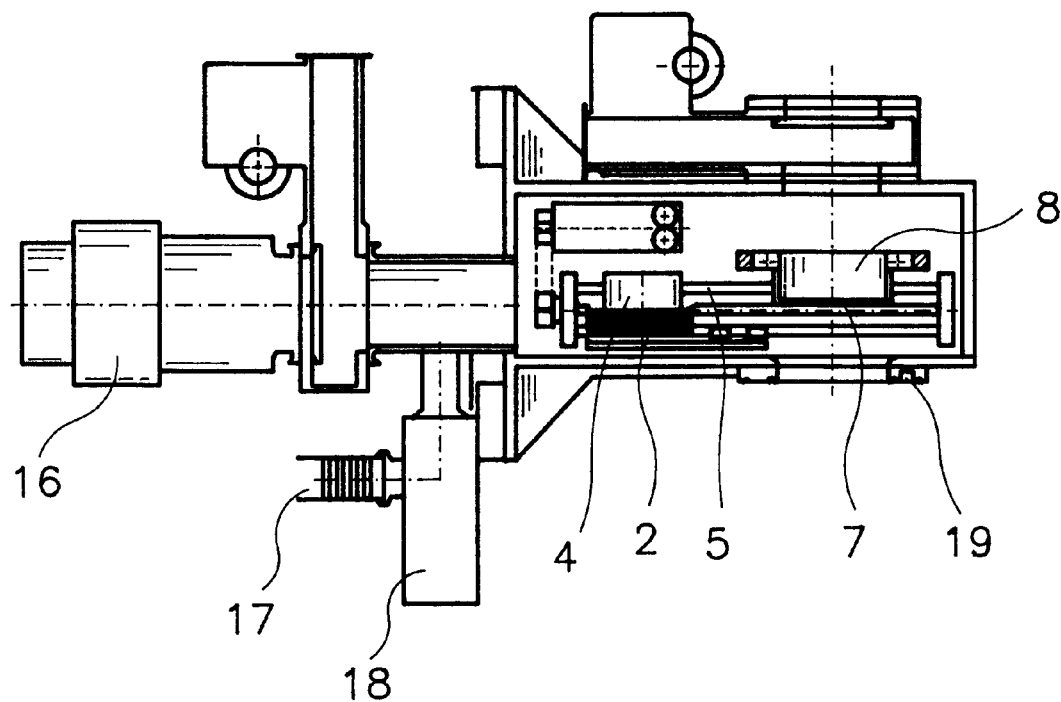
FIG. 3 shows the processing chamber in an open position in the side view with the cover magazine and the handling system belonging to it.
Figure 4:
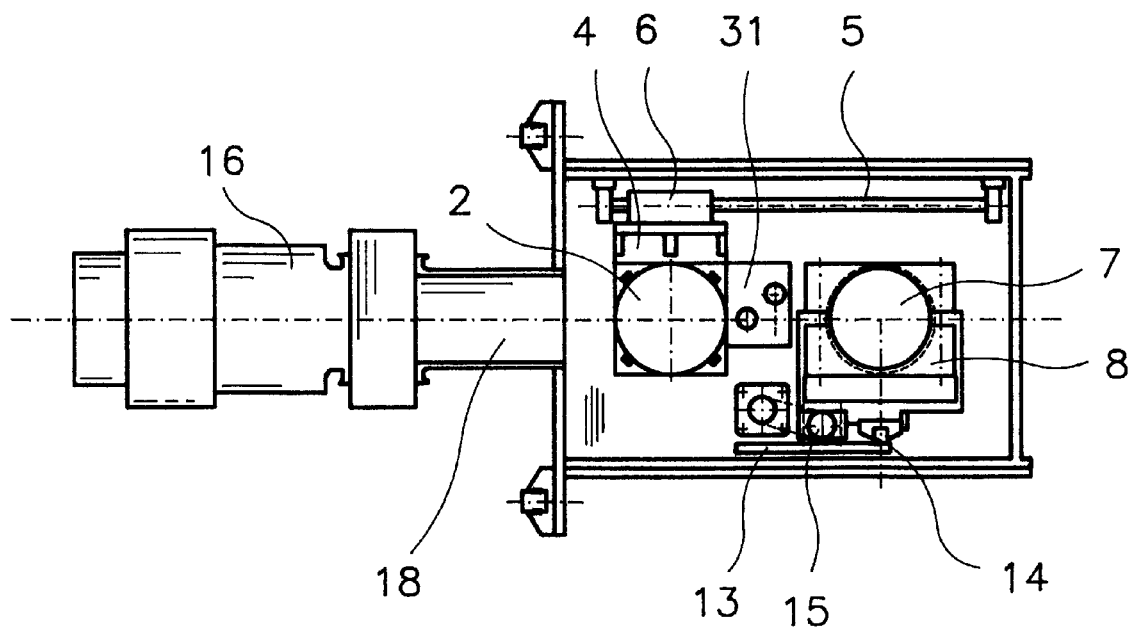
FIG. 4 shows the view from above of the processing chamber in an open position and FIG. 5 shows the gripper for the cover with the lifting unit belonging to it and the arrangement of the linear actuation system for the U-shaped shells.
Figure 5:
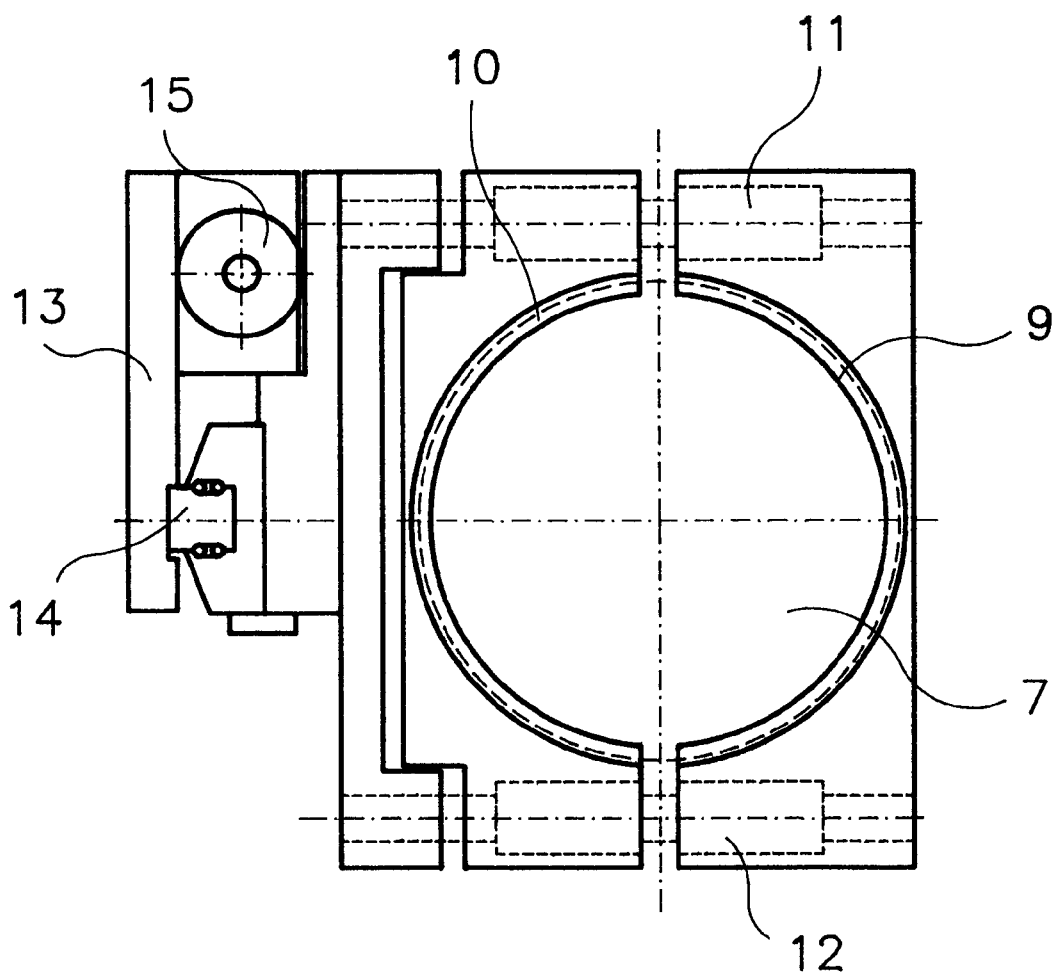

Referring to the appended drawings by means of the FIG. 1–5 the first example is made clear. The later said example gives a description of the standard equipment of the device for producing heat insulating bodies 35 in form of multi layered constructed bodies preferably consisting of a heat insulating frame, metallic walls and a heat insulating filling, said filling preferably arranged for the future in pressed condition as a panel loose between the metallic walls. A processing chamber (1) perpendicular movable by means of a actuating drive (19) is mounted at a frame 21. The vacuum is formed by a turbomolecular pump (16) connected to a lock (18). The lock (18) and the processing chamber (1) are evacuated to a pre-vacuum by joining a slide vane rotary vacuum pump (17). During the described process evacuating times of approximately 4 min/1 qm insulating area of the heat insulating body are obtained. The thickness of said heat insulating body is between 20 . . . 30 mm. In the processing chamber (1) are integrated a magazine (2) and a handling system for the covers (7). The magazine (2) picks up a multiple number of covers (7) lying upon another in loose sequence. The magazine (2) position is on a carriage (4) that is moved towards the handling system by means of a rod guidance (5) in horizontal direction by means of a linear motor operator (6). The processing chamber (1) is fitted with a lock (18) at the lateral wall opposite the rod guidance (5) so that the unloaded hopper (2) may be replaced by a loaded one.

The handling system consists of a gripper (8), a perpendicular movable lifting unit (13) an two linear actuations (11 and 12) for the gripper (8). Said gripper (8) consists of two U-shaped shells (9 and 10), these shells (9 and 10) are movable one towards the other or against each other by means of the two linear actuations. The covers (7) are positioned with the magazine (2) as a whole underneath the gripper (8), whereas the perpendicular lifting unit (13) remains in the upper position. At the end of the described procedure the gripper (8) picks up a cover (7) from the magazine (2) and in doing so the U-shaped shells (9 and 10) which have been opened before are brought together. Said U-shaped shells (9 and 10) show an aperture at the lower edge in its complete extent, so that the cover (7) is fixed horizontally at the edge and said cover (7) is encircled by the U-shaped shells (9 and 10) in its complete extent. The perpendicular lifting unit (13) consists of a guiding device (14) and a linear actuation (15).

Said arrangement guaranties the exact positioning of the cover (7) and said cover is spotted definitely at the metallic wall of the heat insulating body, said wall is fitted at the processing chamber (1). The length of the gripper (8) corresponds at least with the thickness of the bottom of the processing chamber (1) including a flange (19) fixed at a first aperture 33 to press the heat insulating body. At the end the heat insulating body is connected detachable to the processing chamber (1). Via an aperture 36 in the wall of the heat insulating body, said aperture is picked by the flange (19) at the processing chamber (1) and said aperture is smaller in its extent than the cover (7), the inner chamber of said heat insulating body is connected to the inner chamber of the processing chamber (1). By evacuating the processing chamber (1) the evacuation of the inner chamber of the heat insulating body is realized at the same time. In the upper plate of the processing chamber (1) and in the axis of symmetry of the cover (7) is positioned a second aperture 34. Above said aperture an electron beam gun is connected. Thus the cover (7) in position is welded with the heat insulating body under vacuum. The cover (7) seals the aperture in the wall of the heat insulating body and in this way the inner chamber is evacuated.

Furthermore in the processing chamber (1) is joined at the movable magazine (2) an apparatus to control the electron beam (31). This control is either possible by means of a load cell which is evaluated outside the processing chamber (1), or by means of a direct beam supervision by means of a CCD-camera.

Basically the electron beam gun is composed of the following elements cathode changing system (25), Whenelt Electrode (26), anode (27), focus coil (28) and deflection system (29). Connected with said electron beam gun is another vacuum pump (24).

The electron beam gun runs at a beam potential of minimum 30 kV to maximum 60 kV. By that means a beam power of electron beam of 4..6 kW is reached. Two different vacuum pump mechanism (16) and (17) respectively (24) are necessary because the pressure inside the electron beam gun is two 10 Th. power lower than the pressure needed for the processing chamber (1). The working pressure of the electron beam gun is $5*10-4$ mbar and the working pressure of the processing chamber (1) including the one of the heat insulating body is $5*10-2$ mbar. These different pressure ratios serve in the electron beam gun as beam producing chamber to protect the cathode of oxidation and furthermore serve for the electric isolation between cathode and anode (27). To stray the electron beam (30) by means of collision with the air molecules, a higher pressure in the processing chamber (1) including the beam impact point is sufficient.

By means of the electron beam welding machine corrosion—resistant iron respectively steel materials are welded, so that the life of the heat insulating body is considerably long-lasting. Connected to the whole device, said device consists of the processing chamber (1) and the electron beam gun, is the electric and electronic system (23), which is necessary for the run of the electron beam gun, is integrated.

According to the second example a laser beam welding plant is connected to the processing chamber (1) instead of the electron beam gun. Said laser beam welding plant consists of a laser beam producing medium in form of the following systems $CO_2$—laser, focus and guide reflectors. The cooling of these reflectors is achieved by means of cooling spirals, said cooling spirals are heat insulating coupled with said reflectors turbolar and are flown with a coolant e.g. water. The construction of the remaining device is equal to the first example. The result of this procedure is the welding of the heat insulating body and the cover (7) by means of laser beams.

According to the third claim an electric welding apparatus is used for the joining of the cover (7) with a metallic wall of the heat insulating body. Therefor a bow shaped electrode, which is detachable at the cover (7) in position, said bow shaped electrode is switched as a resistance in a circuit, and said bow shaped electrode is detached by means of a perpendicular movable carriage. While closing the circuit the bow shaped electrode is heated till the melting point of the used metals for the cover (7) and the wall of the heat insulating body, followed by the welding of these parts.

The tenor of further examples is that the solutions according to the three examples mentioned above are not joined with a solid frame (21) but with a movable device. The most effective way is to connect the device for the production of heat insulating bodies as a whole to a industrial robot. By that means it is possible to seal already mounted heat insulating bodies respectively bodies of any size and shape, said bodies have already been evacuated.

According to further examples the devices (22) for a solid and hermetic joining of the cover (7) with the heat insulating body are fixed with a movable apparatus e.g. an industrial robot. In the technological processing chain at least three processing chambers (1) are necessary whereby the following phases are carried out successively:

removal of an evacuated heat insulating body and connection of a non evacuated;

pre-evacuation and welding of the cover (7) with the evacuated heat insulating body.

In this most simple technological process only one of the devices (22) which are mentioned in the examples above is necessary for a solid and hermetic joining of the cover (7) with the heat insulating body and said device can be set in continuously and as a result effectively.

I claim:

1. A device for producing a heat insulating body consists of a heat insulating frame, metallic walls and a heat insulating filling, comprising a frame (21);

a processing chamber (1) having an aperture (33) and connected to a vacuum forming system (16, 18) consisting at least of one vacuum forming device wherein the processing chamber is movably mounted at the frame (21);

a magazine (2) disposed in said processing chamber for storing covers (7);

a handling system for positioning the covers (7) and disposed in the processing chamber (1), wherein said handling system removes and transports one of the covers (7) to a given position;

a vacuum lock (3) connected to said processing chamber to change the magazine (2) from an empty magazine into a loaded magazine;

a device (22) for carrying out a joining process of one of the covers (7) to a heat insulating body (35), wherein the device (22) is hermetically sealed to the processing chamber (1), and wherein the heat insulating body is coupled detachably and hermetically sealed to the processing chamber (1) at the aperture (33) of the processing chamber (1)

an entire electric and electronic system (23) disposed at the device (22);

a frame (21) supporting the device (22);

a movable mounting system (37), wherein the device for producing the heat insulated bodies is mounted solidly to the frame (21) as well as to the movable mounting system (37) for supervising the joining process.

2. The device of claim 1, wherein the covers (7) are superposed in loose sequence on a top of the magazine (2) and wherein said magazine is fitted with a horizontal movable carriage (4).

3. The device of claim 1, wherein the handling system consists of a gripper (8) encircling the covers (7), and wherein said gripper (8) is connected to a vertically movable lifting unit (13).

4. The device of claim 3, wherein the gripper (8) consists of two U-shaped shells (9 and 10) which are movable one towards the other and away from each other, respectively, so that the cover (7) is held and supported at its lower side and over its full circumference, wherein the length of said U-shaped shells (9 and 10) with one of the covers (7), held at its circumference, is equal to a thickness of a bottom of the processing chamber (1) including a flange (19) connected to said processing chamber (1).

5. The device of claim 4, wherein the two U-shaped shells (9 and 10) of the gripper (8) are coupled to each other at least via two linear actuation systems (11 and 12).

6. The device of claim 1, wherein the device (22) is an electron beam gun, and further comprising an electron-beam-monitoring device (31) disposed in the processing chamber (1).

7. The device of claim 6, further comprising a second vacuum forming system (24), consisting at least of one vacuum forming device, and connected to the electron beam gun and joined hermetically sealed with said electron beam gun.

8. The device of claim 1, wherein the device (22) is a laser beam welding apparatus including a laser-beam guiding and a laser-beam focussing.

9. The device of claim 8, further comprising at least a forced-cooling reflecting system provided for the laser-beam guiding and the laser-beam focussing.

10. The device of claim 1, wherein the device (22) is an electric welding plant.

11. The device of claim 10, further comprising a heating element (38) disposed in the device (22) wherein the heating element (38) is adapted to geometry of one of the cover (7), wherein the heating element is employed as a resistance in an electrical circuit, and wherein said heating element (38) is vertically movable in a direction toward the heat insulating body.

12. A device for producing a heat insulating frame from a frame precursor having an opening on one side and from a cover matching said opening, comprising a machine frame;

a vacuum generating system attached to the machine frame;

a processing chamber attached to the machine frame, having an aperture adapted to surround the opening of the frame precursor when the frame precursor is placed sealingly and detachably from an outside of the processing chamber against the processing chamber, connected to the vacuum generating system, and movably mounted at the machine frame;

a magazine disposed in said processing chamber for storing the cover matching the opening of the frame precursor;

mechanical manipulating means disposed in the processing chamber for positioning the covers, wherein said mechanical manipulating means removes and transports individual covers to a predetermined position;

a vacuum lock connected to said processing chamber to allow replacement of the processed covers present in the magazine;

a joining device sealingly attached to the chamber and operating inside of the chamber for attaching the cover over the opening of the precursor frame.

13. The device for producing a heat insulating frame according to claim 12 further comprising a movable mounting system, wherein the machine frame is mounted solidly to the movable mounting system;

an electronic control system disposed at the machine frame for controlling and for feeding power to the joining device and for supervising the joining process;

means for magazine substitution disposed in the chamber, wherein the replacement of the processed cover is provided by substituting the magazine present in the chamber by a second like magazine carrying a cover.

14. The device for producing a heat insulating frame according to claim 12 further comprising a carriage movable in a horizontal direction, wherein the covers are superposed in loose sequence on a top of the magazine, and wherein said magazine is supported by the carriage movable in a horizontal direction.

15. The device for producing a heat insulating frame according to claim 12 further comprising a vertically movable lifting unit, wherein the mechanical manipulating means comprises a gripper encircling the cover, and wherein said gripper is connected to the vertically movable lifting unit, wherein the gripper consists of two U-shaped shells, which shells are movable one towards the other and away from each other, respectively, wherein the length of said U-shaped shells plus the cover, held at the circumference of said U-shaped shells, is equal to a thickness of a bottom of the processing chamber plus a flange connected to said processing chamber;

two linear actuation systems disposed in the chamber, wherein the two U-shaped shells of the gripper are coupled to each other at least via the two linear actuation systems.

16. The device for producing a heat insulating frame according to claim 12 wherein the joining device is an electron beam gun, and further comprising an electron-beam-monitoring device disposed in the processing chamber;

a second vacuum generating system connected to the electron beam gun and joined hermetically sealed to said electron beam gun.

17. The device for producing a heat insulating frame according to claim 12 wherein the joining device is a laser beam welding apparatus including a laser-beam guiding means and a laser-beam focussing means and at least a forced-cooling reflecting system provided for the laser-beam guiding means and the laser-beam focussing means.

18. The device for producing a heat insulating frame according to claim 12 wherein the joining device is an electric welding plant.

19. The device for producing a heat insulating frame according to claim 12 further comprising a heating element disposed in the joining device, wherein the heating element is adapted to a geometry of the cover, wherein the heating element is employed as a resistance heater in a electrical circuit, and wherein said heating element is vertically movable in a direction toward the heat insulating body.

* * * * *